Oct. 20, 1970 JAMES E. WEBB 3,535,657
ADMINISTRATOR OF THE NATIONAL AERONAUTICS
AND SPACE ADMINISTRATION
PULSE-WIDTH MODULATION MULTIPLIER

Filed Sept. 13, 1967 2 Sheets-Sheet 1

A. William Carlson
Charles A. Furciniti
Inventors
by G. T. McCoy
John R. Manning
Attorneys

INVENTORS
A. WILLIAM CARLSON
CHARLES A. FURCINITI

United States Patent Office 3,535,657
Patented Oct. 20, 1970

3,535,657

PULSE-WIDTH MODULATION MULTIPLIER

James E. Webb, Administrator of the National Aeronautics and Space Administration, with respect to an invention of Arthur William Carlson, Harrison, Maine, and Charles A. Furciniti, Sudbury, Mass.

Filed Sept. 13, 1967, Ser. No. 668,302
Int. Cl. H03k 7/08
U.S. Cl. 332—9 6 Claims

ABSTRACT OF THE DISCLOSURE

A device for increasing, multiplying or amplifying, by some constant factor, the width modulation of a pulse width modulated signal wherein the output pulse train has a greater degree of width modulation than the input width-modulated signal. The input width-modulated signal pulse train is first integrated by a suitable R-C network, the time constant thereof being chosen, with respect to the pulse repetition frequency of the input signal, to provide an essentially peaked signal. The peaked signal, when applied as an input to a trigger circuit, causes the circuit to switch from one output level to another to generate the required modulated output signal.

The invention described herein was made in the performance of work under a NASA Contract and is subject to the provisions of Sec. 305 of the National Aeronautics and Space Act of 1958, Public Law 85–568 (72 Stat. 435; 42 U.S.C. 2457).

BACKGROUND OF THE INVENTION

This invention relates to modulation systems and, more particularly, to a device for increasing, multiplying or otherwise amplifying, by some constant factor, the width modulation of a pulse width modulated signal.

Earlier methods of amplification or multiplication of pulse width modulated (PWM) signals required the use of a low-pass filtering system to recover the modulation component on the signal and the use of the recovered modulation as the input to another pulse width modulator. The modulation was capable of being increased by the repeated or cascading of operations of this sort provided that the modulation-demodulation process yields gain in signal strength. Similarly, certain types or methods of frequency multiplication of phase-modulated signals may be suitably modified to operate with PWM signals.

The disadvantages of the prior art systems reside in the fact that they are considerably more complex than the subject invention. For example, if the modulating signal recovered by the low-pass filter is used as the input to another PWM, any distortion introduced by the low-pass filter or any ripple components remaining after filtering become a source of distortion which would then be applied to the second modulator. Thus, the prior art has had to resort to large and rather elaborate filtering systems. The problem becomes particularly severe in instances where the modulation component to be recovered is small (as it normally would be when one is concerned about increasing it). The low-pass filter is now required to separate or recover a relatively small modulation component in the presence of a large amount of ripple component. Similarly, to resort to frequency multiplication would undesirably change the pulse rate to a higher frequency by the same factor that the modulation is increased.

We have found that we are able to improve the linearity of a PWM system by allowing a first pulse modulator to operate over that portion of its range where modulation is a linear function of the modulating signal and then, by utilizing our invention, multiplying the modulation to any degree desired.

SUMMARY OF THE INVENTION

In our device, the modulated pulse width signal, from a prior pulse width modulator, is utilized as the input of a modulation multiplier to produce an output pulse train having a higher degree of modulation than the original input pulse signal. Included in the modulation multiplier circuit is an R-C low-pass filter circuit which integrates the input pulse train. The factor by which the modulation of the input PWM signal is multiplied or increased is dependent upon the ratio of the time constant of the low-pass integrating circuit to the pulse period; the multiplication is approximately $4T_c/T$, where $T_c$ is the time constant of the low-pass integrating circuit and T is the period of the PWM signal pulses. When $T_c/T$ is greater than one, the multiplication factor is quite constant over the whole range of output modulation while the maximum error in linearity is less than two percent when $T_c/T$ is equal to one. The modulation muliplication factor is increased and the linearity is improved as $T_c$ is increased, but the peak-to-peak amplitude of the sawtooth waveform $V_{2b}$ is decreased as $T_c$ is increased to set a limitation on the magnitude of $T_c/T$. It is, therefore, desirable that the amplitude of the sawtooth waveform be appreciably greater than the level of signal needed to operate the switch controlled by the sawtooth. The sawtooth waveform applied to the input of the switching circuit causes the output voltage of the switching circuit to switch from one voltage level to another according to whether the input sawtooth waveform is above or below the switching point of the switching circuit. This generates an output pulse train having the same period, but a higher degree of modulation, than the input pulse train.

It is, therefore, a principal object of the present invention to provide a simple pulse width modulation system which operates upon the original pulse width modulated signal to generate an output pulse train having a greater degree of pulse width modulation than the input signal.

Another principal object of the present invention is to provide a pulse width modulation system with improved linearity by allowing a first pulse width modulator to operate over that portion of its range where modulation is a linear function of the modulating signal, then multiplying the modulation to the desired degree.

The features of our invention which we believe to be novel are set forth with particularity in the appended claims. Our invention itself, however, both as to its organization and method of operation, together with further objects and advantages thereof, may be best understood by reference to the following description taken in conjunction with the following drawings.

DESCRIPTION OF THE PREFERRED EMBODIMENT

Figure 1:
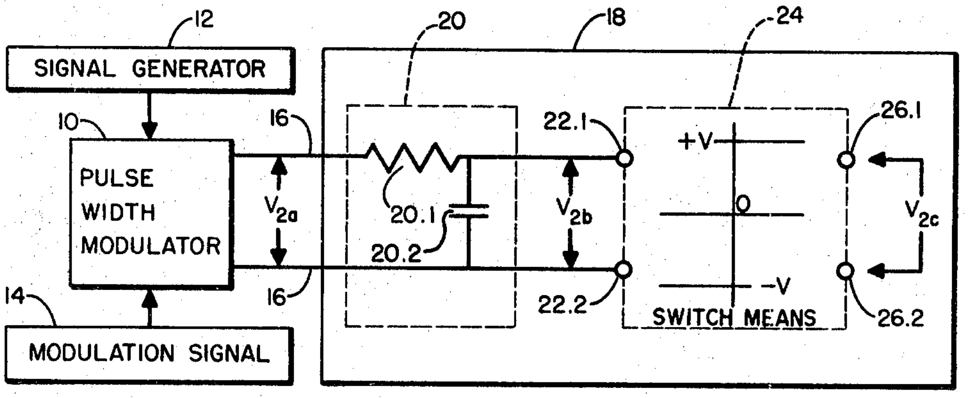
FIG. 1 is a partial schematic and block diagram of our invention.

Referring now to FIG. 1, there is shown our novel pulse width modulator for operating on a signal generated from a first pulse width modulator 10. In this embodiment, a signal derived from a generator 12 and a modulation signal 14 are applied to the first pulse width modulator 10 which produces a pulse width modulated signal. The pulse width modulated signal having a waveshape $V_{2a}$ (FIG. 2A) is applied, by means of a pair of leads 16, as an input to our novel modulator 18. The first stage of a modulator 18 consists of an integrator 20 having a series resistor 20.1 and a shunt capacitor 20.2 in the usual integrator configuration. The input signal $V_{2a}$, having been integrated, now appears as $V_{2b}$ at the output thereof, is applied to a pair of terminals 22.1 and 22.2, and represents the input to a switch means 24. The output of the switch means 24 may be derived from a pair of terminals 26.1 and 26.2 and appears as $V_{2c}$.

Figures 2A, 2B, 2C:
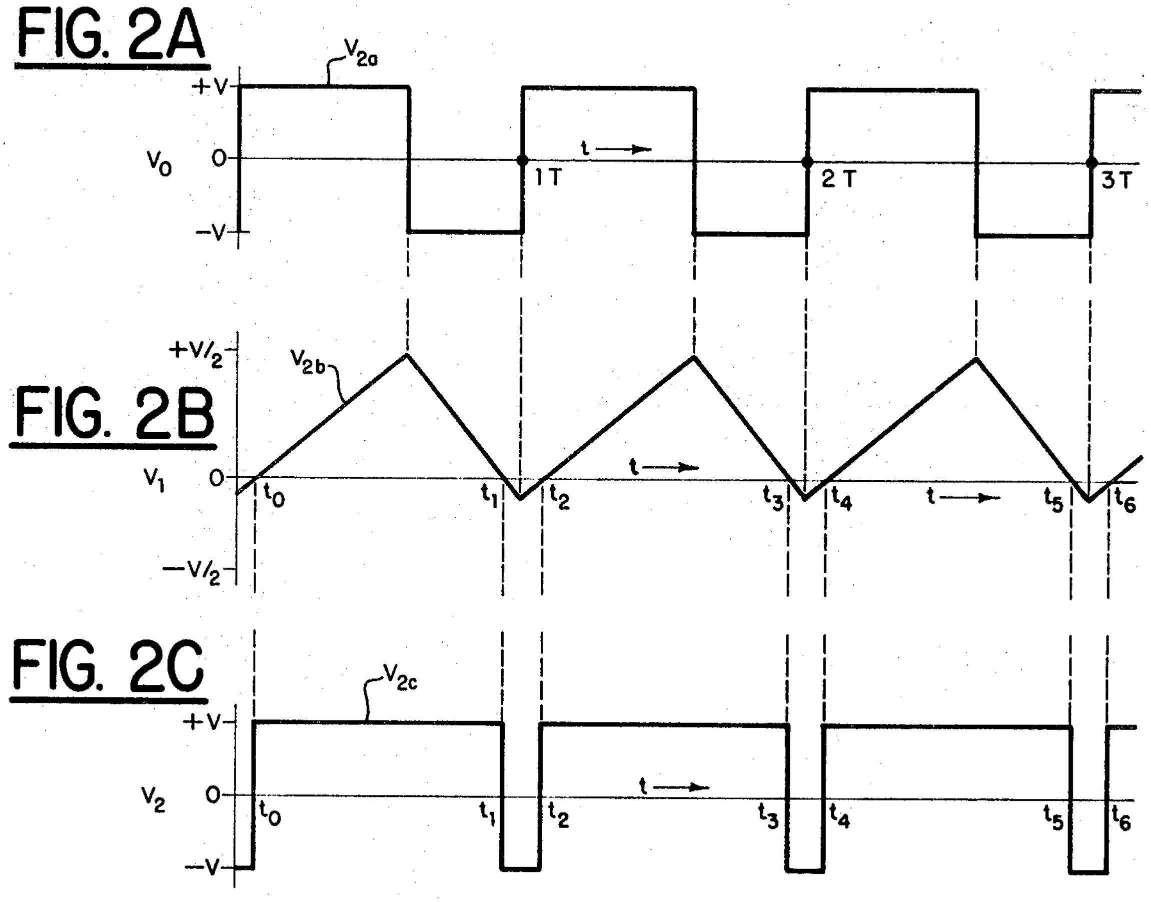
FIG. 2A is a plot (V vs. $t$) of the waveform $V_{2a}$ appearing in FIG. 1.
FIG. 2B is a plot (V vs. $t$) of the waveform $V_{2b}$ appearing in FIG. 1.
FIG. 2C is a plot (V vs. $t$) of the waveform of the output pulse width modulated signal $V_{2c}$ appearing in FIG. 1.

We now refer to the waveforms shown in FIG. 2A, FIG. 2B and FIG. 2C which, together with FIG. 1, are used to better describe and understand the operation of our invention. In our device, signal $V_{2a}$ is the signal appearing at the output of the pulse width modulator 10 and is shown in FIG. 2A as a plot of voltage ($V_{2a}$) versus time ($t$) with the waveforms having period T. It is this signal $V_{2a}$ that is applied to the input of the R-C low-pass network 20. When $T_c/T$ is equal to or greater than one, the peak-to-peak amplitude of the sawtooth voltage $V_{2b}$ appearing across capacitor 20.2 is substantially constant over the whole range of output modulation. This sawtooth waveform is superimposed upon a waveform proportional to the modulating signal of the input pulse train and is, therefore, displaced vertically according to the magnitude and sign of the modulating signal. The voltage $V_{2b}$ consists of the sum of a sawtooth made up of exponential segments (which become straighter as $T_c/T$ is increased) and a low-frequency modulation signal which, when applied to the input of the switching circuit 24 at terminals 22.1 and 22.2, causes the switching circuit 24 to generate the output signal $V_{2c}$ having a greater degree of modulation than the input PWM signal. (While the signals of FIG. 2 are shown as being bipolar, it should be obvious that they may be unipolar.)

It is this signal $V_{2b}$ that is applied to the switching circuit 24 which may include transistor and vacuum tube Schmitt trigger circuits, zero crossing detectors, comparators, saturated or over-driven amplifiers, two-state circuits or devices such as four-layer diodes and triodes, tunnel diodes and negative resistance devices. In brief, any of a great number of circuits and devices may be used that detect and respond to changes in voltage or current levels or changes in polarity.

Thus, the signal $V_{2b}$ of FIG. 2B that is applied to the switching circuit 24 has one polarity (+) for the period of time from $t_0$–$t_1$. From time $t_1$–$t_2$, the polarity is negative (−) while from time $t_2$–$t_3$, the polarity is positive (+). Similarly, from time $t_3$–$t_4$, $V_{2b}$ (FIG. 2B) has a negative (−) polarity, while from time $t_4$–$t_5$, it has a positive (+) polarity. This is determined by the R-C constant (the value of the resistor 20.1 and the capacitor 20.2). Thus, during those intervals of time that $V_{2b}$ is positive, ($t_4$–$t_1$, $t_2$–$t_3$, $t_4$–$t_5$) the output of the switching circuit 24, appearing at a pair of terminals 26.1 and 26.2 and shown as $V_{2c}$ in FIG. 2C will be at level +V. During those periods of time that $V_{2b}$ is negative ($t_1$–$t_2$, $t_3$–$t_4$, $t_5$–$t_6$) the output level will be level −V, as shown in FIG. 2C. In this manner, varying the level about which the signal $V_{2b}$ is switched will determine the new modulation value appearing as signal $V_{2c}$ (FIG. 2C).

Figure 3:
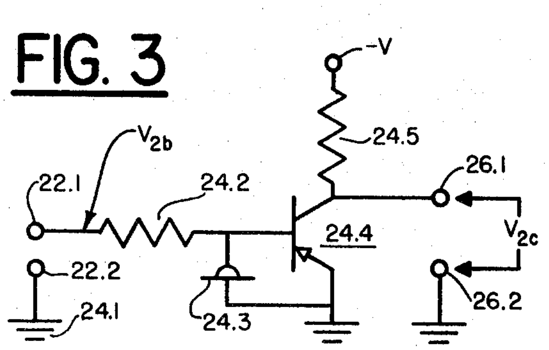
FIG. 3 is a schematic diagram of one form of switching circuit which may be utilized in our invention.
Figure 4:
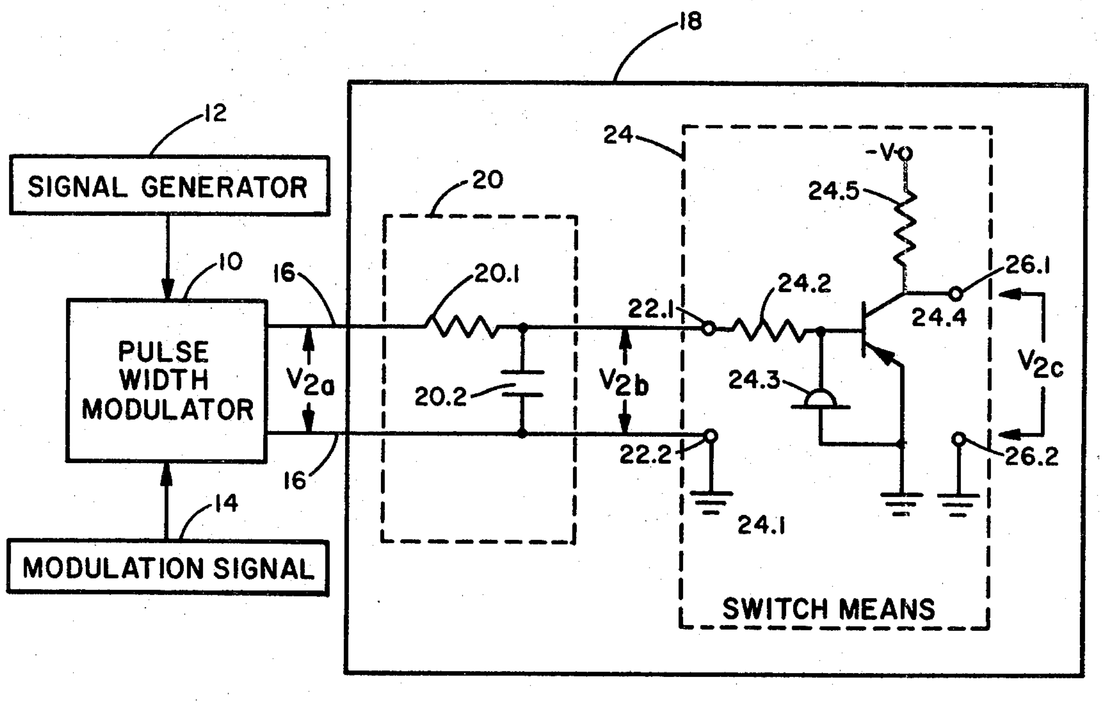
FIG. 4 is a partial schematic and block diagram combining the disclosure of FIGS. 1 and 3.

Referring now to FIGS. 3 and 4, there is shown one form of switching device. It should be understood that various other circuits may be used herein and we do not wish to be limited solely to the circuit shown. In FIG. 3, the input signal $V_{2b}$ is applied to the terminals 22.1 and 22.2, the latter of which is at some reference potential herein shown as a ground 24.1. A series limiting resistor 24.2 is connected between the terminals 22.1 and the base of a PNP transistor 24.4. A tunnel diode 24.3 is connected between the base and ground with the emitter also connected to ground. The collector is connected, through a decoupling resistor 24.5, to a source of potential at voltage level −V, with the output of our device appearing at a terminal 26.1, which is also connected to the collector. Output terminal 26.2 is connected to ground to complete the circuit.

What we claim is:

1. A modulation system comprising:
- means for providing a modulated signal;
- a voltage divider network having first and second impedances;
- means for applying the modulated signal to the voltage divider network;
- means for deriving a switching signal from across one of the impedances;
- switching means operating at either a first or at a second selected voltage level, and
- means for applying the switching signal to the switching means to periodically, alternately vary the voltage from the first selected level to the second selected level, in accordance with the switching signal.

2. The modulation system of claim 1, wherein:
- the modulated signal is pulse width modulated having an essentially rectangular, substantially periodic, regular waveshape.

3. The modulation system of claim 2, wherein:
- the first impedance is connected in series with the input and the output and with said second impedance in shunt between said input and output, and
- the modulated signal is applied across both said impedances.

4. The modulation system of claim 3, wherein:
- the voltage divider network is a resistance-capacitance integrator circuit;
- the first impedance is a resistor;
- the second impedance is a capacitor, and
- the switching signal is derived from across the capacitor.

5. The modulation system of claim 4, wherein:
- the time constant of the resistance-capacitance is of the order of the period of the modulated signal or greater.

6. A modulation system comprising:
- means for providing an essentially rectangular, substantially periodic pulse width modulated signal;
- a resistor-capacitor circuit having the resistor connected in series between the input and the output and the capacitor in shunt thereto, said circuit having a time constant of the order of the period of the modulated signal or greater;
- means for applying the pulse width modulated signal across the resistor-capacitor circuit to derive a switching signal from across the capacitor;

transistor switching means for operating either at a first or at a second voltage level and having a base, a collector and an emitter;

a first limiting resistor connected between the common junction of the resistor-capacitor circuit and the base of the transistor switching means;

a tunnel diode connected between the base and emitter of the transistor switching means;

the emitter connected to a source of reference potential at the second voltage level;

a source of operating potential at the first voltage level;

a second limiting resistor connected between the source of operating potential and the collector of the transistor switching means;

a pair of output terminals;

one output terminal connected to the collector of the transistor switching means, and the other of the output terminals connected to the source of reference potential.

References Cited

UNITED STATES PATENTS

| | | | |
|---|---|---|---|
| 2,987,633 | 6/1961 | Pallas | 307—234 |
| 3,064,208 | 11/1962 | Bullock et al. | 332—9 |
| 3,191,065 | 6/1965 | Vargiu | 329—106 X |
| 3,211,926 | 10/1965 | Frysinger | 307—267 X |
| 3,246,247 | 4/1966 | Grindle. | |
| 3,371,291 | 2/1968 | Forrest et al. | 332—9 X |

OTHER REFERENCES

Fulcher: "Pulse Generator" August 1965, RCA Technical Notes.

ALFRED L. BRODY, Primary Examiner

U.S. Cl. X.R.

307—246, 265; 325—142; 328—58; 329—106